United States Patent
Huang et al.

(10) Patent No.: US 9,392,513 B2
(45) Date of Patent: Jul. 12, 2016

(54) HANDOVER PARAMETER RANGE CONTROL

(75) Inventors: Min Huang, Beijing (CN); Petter Bergman, Ljungsbro (SE); Guo Chen, Beijing (CN); Xiaodong Yang, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/383,842

(22) PCT Filed: Mar. 13, 2012

(86) PCT No.: PCT/SE2012/050279
§ 371 (c)(1),
(2), (4) Date: Sep. 8, 2014

(87) PCT Pub. No.: WO2013/137785
PCT Pub. Date: Sep. 19, 2013

(65) Prior Publication Data
US 2015/0133119 A1    May 14, 2015

(51) Int. Cl.
*H04W 36/00* (2009.01)
*H04W 36/24* (2009.01)
*H04W 36/18* (2009.01)
*H04W 28/08* (2009.01)

(52) U.S. Cl.
CPC ...... *H04W 36/0094* (2013.01); *H04W 36/0083* (2013.01); *H04W 28/08* (2013.01)

(58) Field of Classification Search
CPC ............ H04W 28/08; H04W 36/0083; H04W 36/0094; H04W 24/02; H04W 16/14; H04W 36/22; H04W 16/00; H04W 16/08; H04W 24/08; H04W 28/0236; H04W 28/0268; H04W 28/16; H04W 36/14; H04W 36/30; H04W 88/18; H04W 36/24; H04W 36/0088; H04W 36/08
USPC .......... 455/436, 424, 114.2, 115.1, 125, 13.4, 455/25, 405, 406, 414.2, 450, 453, 500, 455/501, 67.13, 437, 442, 439, 441, 443, 455/456.1, 522; 370/331, 229, 255, 315, 370/329, 332
See application file for complete search history.

(56) References Cited

U.S. PATENT DOCUMENTS

2004/0038681 A1* 2/2004 Chun ................ H04W 36/0072
                                                    455/436
2004/0147264 A1* 7/2004 Ogawa ................. H04W 36/30
                                                    455/441

(Continued)

OTHER PUBLICATIONS

3GPP TSG-RAN WG3 Meeting #65, R3-091565 Shenzhen, China, Aug. 24-28, 2009.*

(Continued)

*Primary Examiner* — Inder Mehra
(74) *Attorney, Agent, or Firm* — Murphy, Bilak & Homiller, PLLC (57) ABSTRACT

The invention relates to a method and device (32) for adapting a range for a handover parameter used in a mobility function and a load balancing function for a first cell in relation to a second cell, where the device is implemented in a node (14) in the wireless communication network and comprises an event monitoring unit (34) configured to monitor handover events and a range setting unit (36) configured to determine the handover parameter range as well as to adapt the handover parameter range based on the monitored handover events.

19 Claims, 5 Drawing Sheets

(56) References Cited

U.S. PATENT DOCUMENTS

2013/0031036 A1  1/2013 Kojima
2015/0024802 A1* 1/2015 Callard ............... H04W 88/08
                                                   455/561

OTHER PUBLICATIONS

3GPP TSG RAN WG3 #65bis R3-092294 Miyazaki, Japan, Oct. 12-15, 2009.*

Unknown, Author, "Intra frequency load balancing", 3GPP TSG RAN WG3 Meeting #59 bis, R3-080756, Huawei, Shenzhen, China, Mar. 31-Apr. 3, 2008, 1-5.

Unknown, Author, "3GPP TR 36.902 V9.3.1 (Mar. 2011)", 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), Mar. 2011, pp. 1-21.

Unknown, Author, "3GPP TS 36.300 V10.3.0 (Mar. 2011)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011, pp. 1-197.

Unknown, Author, "3GPP TS 36.331 V10.1.0 (Mar. 2011)", 3rd Generation Partnership Project; Technical Specification Group Radio Access Network; Evolved Universal Terrestrial Radio Access (E-UTRA); Radio Resource Control (RRC); Protocol specification (Release 10), Mar. 2011, pp. 1-290.

Unknown, Author, "Conflict Avoidance between MLB and MRO", 3GPP TSG-RAN WG3 Meeting #65, R3-091565, CATT/CATR/ZTE, Shenzhen, China, Aug. 24-28, 2009, pp. 1-6.

Unknown, Author, "Considerations of MRO and MLB Integration", 3GPP TSG-RAN WG3 Meeting #73bis, R3-112638, China Unicom, Zhuhai, China, Oct. 10-14, 2011, pp. 1-3.

Unknown, Author, "Discussion on MLB", 3GPP TSG-RAN WG3 #65bis, R3-092409, Qualcomm Europe, Miyazaki, Japan, Oct. 12-16, 2009, p. 1.

Unknown, Author, "Handover Configuration Change for MRO", 3GPP TSG-RAN WG3 Meeting #67, R3-100840, Kyocera Corporation, San Francisco, USA, Feb. 22-26, 2010, pp. 1-5.

Unknown, Author, "Mobility Load Balancing Optimization Solution", 3GPP TSG-RAN WG3 Meeting #59, R3-080361, Huawei/Telecom Italia, Sorrento, Italy, Feb. 11-15, 2008, pp. 1-4.

Unknown, Author, "MRO MLB Interaction", 3GPP TSG-RAN WG3 Meeting #74, R3-112772, Huawei, San Francisco, USA, Nov. 14-18, 2011, pp. 1-2.

Unknown, Author, "Requirements for MRO and MLB Coordination", 3GPP TSG-RAN WG3 Meeting #73bis, R3-112407, CMCC, Zhuhai, China, Oct. 10-14, 2011, pp. 1-3.

Unknown, Author, "The Correlation between MBL and MRO", 3GPP TSG-RAN WG3 #65bis, R3-092294, ZTE/CATT, Miyazaki, Japan, Oct. 12-15, 2009, pp. 1-8.

* cited by examiner

HANDOVER PARAMETER RANGE CONTROL

TECHNICAL FIELD

The application relates to communication in wireless communication networks. More particularly, the application relates to a method and device for adapting a range for a handover parameter used in a mobility function and a load balancing function for a first cell in relation to a second cell.

BACKGROUND

In wireless communication networks such as in Long Term Evolution (LTE) wireless networks there exist various functions for providing efficient communication. One function is Mobility Robustness Optimization (MRO). MRO is described in for instance 3GPP TS 36.300. MRO provides an offset to be applied in handovers, which is used to ensure that handovers are performed reliably but not excessively. Another function is load balancing, such as Mobility Load Balancing (MLB). MLB is for instance described in 3GPP TS 36.300.

In both these functions there is a use of a handover parameter, such as cell-individual offset (CIO). This common parameter is thus used by the two functions for different purposes.

In case the use of the handover parameter is not coordinated these two functions might disturb each other, leading to both functions operating unsatisfactorily. There is thus a need for the coordination of the use of the handover parameter in the two functions.

The invention is directed towards this type of coordination.

SUMMARY

The invention is therefore directed towards coordinating the use of a handover parameter for a mobility function and a load balancing function in a wireless communication network.

This object is according to a first aspect of the invention achieved through a method of adapting a range for a handover parameter used in a mobility function and a load balancing function for a cell in relation to a neighbour cell in a wireless communication network. The method is performed by a node in the wireless communication network and comprises:
determining the handover parameter range,
monitoring handover events in the wireless communication network concerning the cell, and
adapting the handover parameter range based on the monitored handover events.

The object is according to a second aspect of the invention achieved through a device for adapting a range for a handover parameter used in a mobility function and a load balancing function for a first cell in relation to a second cell. The device is implemented in a node in the wireless communication network and comprises:
an event monitoring unit configured to monitor handover events, and
a range setting unit configured to determine the handover parameter range and adapt the handover parameter range based on the monitored handover events.

In a first variation of the first aspect the adapting comprises shrinking the handover parameter range.

In a corresponding first variation of the second aspect, the range setting unit is configured to shrink the handover parameter range when performing adapting of the handover parameter range.

In a second variation of the first aspect, the method further comprises selecting a value in the handover parameter range based on a current load of the cell. In this variation the monitored handover events also comprise handover events obtained when the selected value is used.

In a second variation of the second aspect, the device further comprises a load balancing function handling unit configured to select a value in the handover parameter range based on a current load of the cell. Also in this variation the monitored handover events comprise handover events obtained when the selected value is used.

In the second variation of the first and the second aspects, the selected value may furthermore be selected by the load balancing function.

The handover parameter range may be defined by a first boundary and a second boundary. It may also be determined using the mobility function. For this reason the device may further comprise a mobility function handling unit and the handover parameter range setting unit may be configured to determine the handover parameter range based on the operation of the mobility function handling unit.

In a third variation of the first aspect, the handover parameter range is further adjusted based on handover parameter values used in the mobility function.

In a third variation of the second aspect, the range setting unit is further configured to dynamically adjust the handover parameter range based on handover parameter values used in the mobility function.

In a fourth variation of the first aspect, the method further comprises initiating the handover parameter range by assigning a first initial value to the first boundary and a second initial value to the second boundary and applying the mobility function for limiting the handover parameter range until a steady state is reached.

In a fourth variation of the second aspect, the range setting unit is configured to initiate the handover parameter range by assigning a first initial value to the first boundary and a second initial value to the second boundary and order the mobility function handling unit to apply the mobility function for limiting the handover parameter range until a steady state is reached.

In a fifth variation of the first aspect, the method further comprises determining at least one handover quality measure based on the monitored handover events and to compare the handover quality measure with a corresponding handover quality criterion, where the adapting comprises adapting the range based on the results of the comparison.

In a fifth variation of the second aspect, the range setting unit is configured to determine at least one handover quality measure based on the monitored handover events and to compare the handover quality measure with a corresponding handover quality criterion, where the adapting comprises adapting the range based on the results of the comparison.

The at least one handover quality measure may comprise a first handover quality measure associated with the first boundary and handovers being performed too early and a second handover quality measure associated with the second boundary and handovers being performed too late. The first handover quality measure may furthermore comprise a first factor and a second factor, each being compared with a corresponding factor criterion and the adapting being performed based on these comparisons. The first factor may depend on handovers being performed too early and the second factor may depend on the difference between handovers being performed too early and handovers performed too late.

In a sixth variation of the first aspect, the adapting comprises adjusting the first boundary based on the first factor meeting a first factor criterion and the second factor meeting a second factor criterion.

In a sixth variation of the second aspect, the range setting unit is configured to adjust, when adapting the handover parameter range, the first boundary based on the first factor meeting a first factor criterion and the second factor meeting a second factor criterion.

The second handover quality measure may comprise a third factor and a fourth factor, where the third factor may depend on handovers being performed too late and the fourth factor may depend on the difference between handovers performed too late and handovers being performed too early.

In a seventh variation of the first aspect, the adapting comprises adjusting the second boundary based on the third factor meeting a third factor criterion and the fourth factor meeting a fourth factor criterion.

In a seventh variation of the second aspect, the range setting unit is configured to adjust, when adapting the handover parameter range, the second boundary based on the third factor meeting a third factor criterion and the fourth factor meeting a fourth factor criterion.

In an eighth variation of the first aspect, the method further comprises investigating if the handover parameter value has stayed at one of the boundaries within an investigation time period and expanding the handover parameter range if it has.

In an eighth variation of the second aspect, the range setting unit is further configured to investigate if the handover parameter value has stayed at one of the boundaries within an investigation time period and expand the handover parameter range if it has.

In a ninth variation of the first aspect, there is a timer running at least for the above-mentioned boundary. Here the investigating comprises comparing the timer with a threshold and the expanding of the handover parameter range comprises changing the boundary for extending the handover parameter range if the threshold is exceeded and resetting the timer each time the boundary is changed.

In a ninth variation of the second aspect, the device comprises a timer set to run at least for the above-mentioned boundary. The range setting unit is further configured to compare the timer with a threshold, change the boundary for extending the handover parameter range if the threshold is exceeded and reset the timer each time the boundary is changed.

The invention has a number of advantages. It proposes a low-complexity solution to handle the coordination of two functions in the wireless communication network a mobility function and a load balancing function. The invention allows the range to be changed dynamically and in a self-adaptable way, so that these two functions can work harmoniously. Good handover performance is ensured together with maximized load balancing.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns handover in a wireless communication network, for instance a mobile communication network like a Long-Term Evolution (LTE).

In the following description the network will be described in the form of a Long Term Evolution (LTE)/System Architecture Evolution (SAE) network as an example. This type of network may furthermore be divided into an access network and a core network. The other name for the LTE/SAE network is the Evolved Packet System (EPS) that comprises both the Evolved UTRAN (E-UTRAN) radio access network and the Evolved Packet Core (EPC) core network, where UTRAN is an acronym for UMTS Terrestrial Radio Access Network. More details about these networks may be found in 3GPP TS 23.401, which is herein incorporated by reference.

Figure 1:
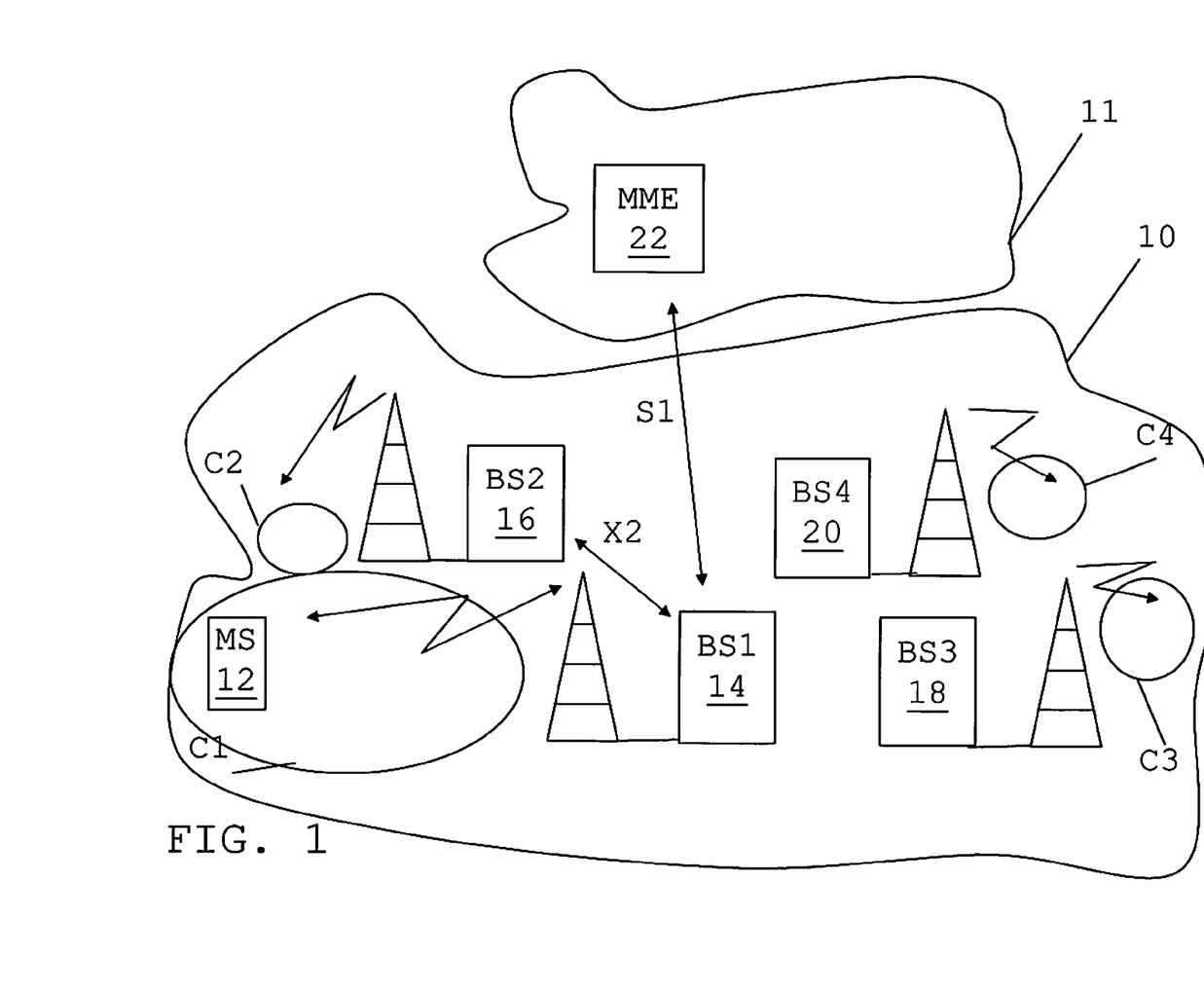
FIG. 1 schematically shows a wireless communication network comprising a number of base stations and a mobile station.

In LTE a base station is normally termed evolved Node B (eNB). FIG. 1 shows an exemplifying access network 10 comprising four base stations, with a first base station BS1 14, a second base station BS2 16, a third base station BS3 18 and a fourth base station BS4 20. The first base station 14 is acting as a serving or source base station in relation to a mobile station 12. Each base station defines at least one cell where the first base station 14 defines a first cell C1, the second base station 16 defines a second cell C2, the third base station 18 defines a third cell C3 and the fourth base station 20 defines a fourth cell C4. The second, third and fourth cells C2, C3 and C4 are all cells that are neighbours to the first cell C1. The functionality of the invention will in the following be described for the first cell C1 and more particularly in relation to load balancing with regard to the second cell C2. It should here be realized that the same principles used for this first cell C1 with regard to the second cell may be employed for the first cell with regard to the third and fourth cells C3 and C4, respectively. The described functionally may in fact be provided for every cell in the network.

It should here be realised that the access network 10 would normally comprise several more base stations, each forming one or more cells. However, only four are shown here in order to focus on the principles of the invention.

In the network there is also a Mobility Management Entity MME 22, which is provided in a core network 11 of the wireless or communication network. Generally an MME is responsible for signalling in respect of a mobile station.

The base stations can be communicating with each other using a so-called X2 interface, where communication between the first and the second base stations 14 and 16 is depicted using this interface. Base stations can also communicate with entities in the core network, such as the MME 22, using a so-called S1 interface. The first base station 14 is here shown as being involved in such communication with the MME 22. These interfaces are for instance defined in the standard 3GPP TS 36.300.

Here it should be realized that base stations can communicate with each other also using the S1 interface, in which case a core network entity, like the MME is acting as a relay node. LTE is furthermore only one example of a network in which the invention may be implemented. It may be implemented in GSM or any kinds of heterogeneous network. Possible access networks are here, GSM EDGE Radio Access Network (GERAN) and in the case of UTRAN for instance time division synchronous code division multiple access (TD-SCDMA).

Figure 2:
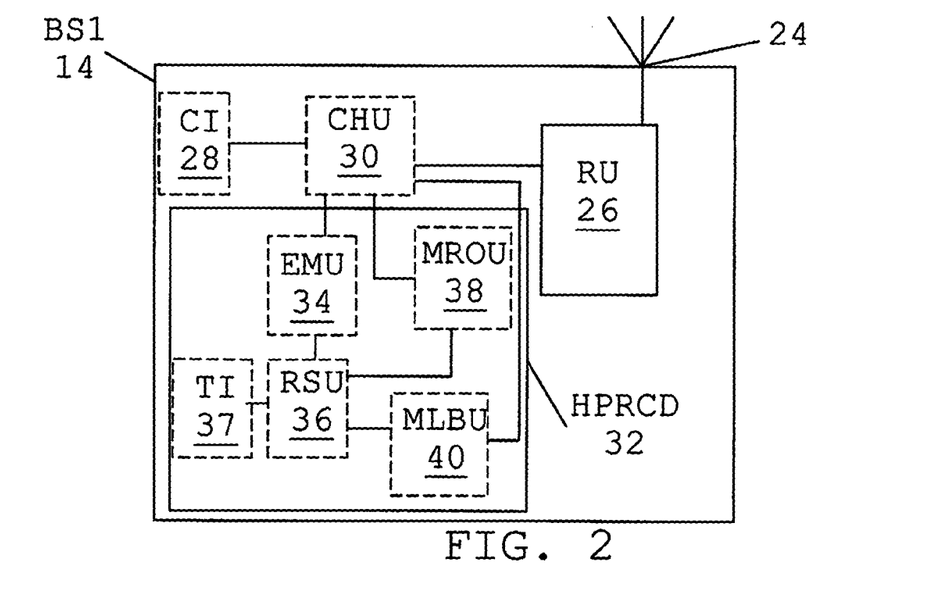
FIG. 2 shows a block schematic of a first base station.

FIG. 2 schematically shows a block schematic of the first base station 14. It comprises a communication handling unit CHU 30, a device for controlling a range of a handover parameter or a handover parameter range control device HPRCD 32, a first communication interface and a second communication interface CI 28. As the handover parameter range control device is provided in a base station, the first communication interface is a wireless communication interface, and here in the form of an antenna 24, which is connected to a radio communication unit RU 26. The communication handling unit 30 is connected between the radio communication unit 26 and the second communication interface 28. The communication handling unit 30 is responsible for handling mobile communication functions, for instance those according to the LTE standard and is furthermore connected to the handover parameter range control device 32. It is more particularly connected to an event monitoring unit EMU 34, to a mobility function handling unit 38 and to a load balancing handling function unit 40 of the handover parameter range control device 32. The mobility function is in this and some other embodiments of the invention a mobility robustness optimization (MRO) function and therefore the mobility function handling unit is in this example a mobility robustness optimization unit MROU. In an analogue manner the load balancing function handling unit 40, is in this example a mobility load balancing unit MLBU, i.e. a unit for handling mobility load balancing.

The event monitoring unit 34 is connected to a range setting unit RSU 36, which range setting unit 36 is also connected to the mobility function handling unit 38, the load balancing function handling unit 40 and to a timer TI 37.

The communication handling unit 30 is responsible for communicating with the mobile stations, such as mobile station 12, over the wireless interface 24 as well as with other network nodes via the second communication interface 28. In the first case the communication may be performed using radio resource control (RRC) messages in order to collect data about for instance handovers.

Handover parameters may be employed by different functions.

Mobility Robustness Optimization (MRO) is introduced into LTE for the purpose of detecting and enabling correction of inappropriate mobility or handover parameters in intra-LTE and Inter radio access technology (IRAT) scenarios.

One type of parameter used by MRO is the cell-individual offset (CIO). CIO is equivalent to the negative value of another parameter: handover margin (HOM). The handover margin is used to control the border of a cell-relation. In the example of FIG. 1 it is used to control the border between the first and second cells C1 and C2. The triggering of such a kind of auto-adjustment is the detection of some pre-defined handover events, including too-early handover (HO), too-late HO, HO to wrong cell. In some advanced use cases, the event of HO oscillation may also taken into account, where HO oscillation is defined as the frequent ping-pong handover between two neighbouring cells in a short time. The above-mentioned events are examples of handover events which may be used in the invention. It should however be realized that the invention is not limited to these specific handover events, but that also other handover events may be used.

The adjustment of CIO (or HOM) has two directions:
decrease CIO (increase HOM), which is triggered by the events of too-early HO, HO to wrong cell, HO oscillation;
increase CIO (decrease HOM), which is triggered by the events of too-late HO.

The function of mobility load balancing (MLB) is introduced into LTE so as to distribute cell load evenly among cells or to transfer part of the traffic from congested cells, by the means of self-optimization of mobility parameters or handover actions. Such a transfer may as an example take place between the first and second cells C1 and C2. If this function is activated, the cells are required to indicate their load information to neighbours periodically, so that the congested cells can be aware whether and to which cell traffic can be off-loaded. The normal parameter for connected-mode HO is also CIO (or HOM). This means that according to this function the increase or decrease of this handover parameter, the user equipment (UEs) being connected to or served by a certain cell and lying in the border to a neighbour cell tend to leave or stay.

Mobility Robustness Optimization (MRO) is defined in for instance 3GPP TS 36.300.

In the description of in 3GPP TS 36.300 MRO is specified as a handover failure detection function that uses RRC Reestablishment Request messages from UE to eNB, X2AP RLF Indication messages and X2AP Handover Report messages between eNBs to determine too early handovers, too late handovers, and handovers to the wrong cell.

Another input for a CIO (or HOM) adjusting function is handover oscillation rate. The handover oscillation is detected using the time of incoming handover, time of outgoing handover, and the content of incoming UE History. UE History is a part of the incoming S1 or X2 Handover Request. An HO In event, i.e. an event concerning a UE handed over to a cell, may contain an identity of the UE, time of incoming handover and UE history. An HO Out event, i.e. an event concerning a UE handed over from a cell, may contain an identity of the UE and time of outgoing handover. These inputs and outputs are thus handled by the communication handling unit 30 of a base station.

In LTE an MRO Parameter Optimization Function uses the input from an HO Failure Detection Function and an HO Oscillation Detection Function, to form statistics, and make decision of changes of connected mode mobility parameters, for example cell individual offset, a3offset, a5offset and hysteresis. The goal for these adjustments is to minimize HO failures and HO oscillations, and if necessary to do a trade-off between HO failures and HO oscillations.

These mobility parameters may be stored in an Management Information Base (MIB) that is here considered to be a part of the communication handling unit 30, and communicated to connected UEs and neighbouring base stations by the communication handling unit 30, either directly using RRC Connection Reconfiguration messages or in the handover process, for instance using the S1 or X2 HO REQUEST ACK message.

Mobility Load Balance (MLB) is defined in 3GPP TS 36.300 and other standardization documents. In the MLB description 3GPP specifies a load balancing function, adjusting the cell borders by changing handover parameters. The load balancing function consists of a Load Assessment Function, and an MLB parameter optimization function. The Load Assessment Function, assesses load of the node, communicates the load information to neighbour nodes, and receives load information from neighbour nodes. The MLB parameter optimization function uses the information on load in the node and load in neighbour nodes to decide changes in the mobility parameters, to adjust the cell borders, and in this way move UEs from a node with high load to a node with low load.

The main problem above is that two functions adjust the same mobility parameters for different purposes. These functions will therefore often disturb each other's operation. They may for instance sometimes suggest different adjustment directions and steps.

A coordination is therefore needed to make sure that a good trade-off between the needs of MLB and MRO could be reached.

However, in order to obtain an efficient coordination there are some problems that need to be addressed, namely How can an allowable handover parameter range be set for the handover parameter. If it is set too large, the risk of HO failure would be increased; if it is set too small, the load balancing performance would be quite limited;

How can the allowable handover parameter range be self-adapted? The proper handover parameter values should be selected in a dynamic rather than static manner, considering the accuracy of detection, the radio environment variance, and network configuration change.

It is thus necessary to 1) guarantee that the handover performance is not degraded, and 2) provide as large potential margin to load balancing as possible.

To this problem, one general understanding is to give MRO higher priority, because a high handover failure rate is more harmful to the network than load unbalance. For this purpose, a range that regulates an upper boundary and a lower boundary of the handover parameter, which is typically CIO or HOM is given by MRO and adjustment of the parameter value is thus allowed to be made by MLB but only within the handover parameter range.

The present invention aims to provide a solution to at least some of these problems. This is furthermore done with low implementation complexity and the possibility to dynamically configure and self-adapt the range for handover parameter adjustment, so as to maximize the trade-off performance for both functions.

The invention uses a joint functionality for handling both functions. This functionality uses an algorithm described in detail below. The principles of the algorithm are to:

optionally control a handover parameter such as handover margin (HOM) of a cell and a neighbor cell by adjusting a handover parameter, like cell individual offset (CIO);

establish a range of allowable handover parameter values, for instance using MRO, where this range is defined by a first and a second boundary;

allow the MLB function to select a handover parameter value in this range depending on the load situation;

when needed, optionally adapt to new radio conditions by trying to expand the range; and reconfigure the allowable range in order to avoid to use handover parameter values with bad impact on the handover failure rate.

The invention will in the following be described in relation to the handover parameter cell individual offset (CIO). It should however be realized that the principles of the invention may also be used with the handover parameter handover margin (HOM).

The parameter cell individual offset (CIO) is in LTE defined as $CIO=CIOn-CIOs$ and used in the Events A3, A4 and A5 A3, A4 and A5 measurements for LTE handover in 3GPP TS 36.331 V10.1.0. Here n denotes a neighbor cell and s a serving cell. By adjusting this parameter, MRO and MLB can fulfill their separate optimization targets.

CIO is defined in a measurement configuration sent from a radio base station (RBS) to a UE and may be obtained in two ways. If the measurement mode is Reference Signal Received Power (RSRP), the base station measures the received power in dBm, i.e. dB compared to a base value of 1 mW. If the measurement mode is Reference Signal Received Quality (RSRQ), the cell measurement is the quota between the total power and the reference power expressed in dB. CIO is then obtained as an offset upon the measured value. The modified value (dB or dBm) is then obtained as CIO (dB)+original value (dB or dBm).

Figure 3A:
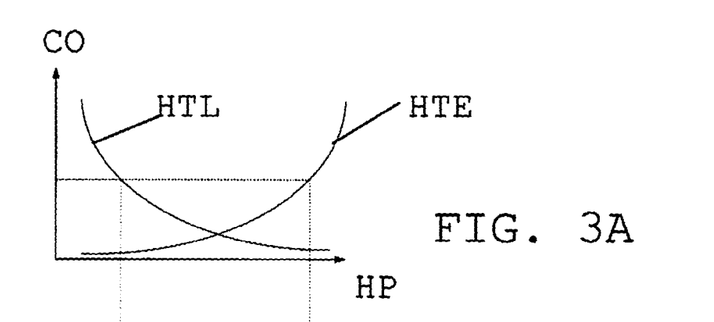
FIG. 3A shows a first curve being a function of the count of too early handovers in relation to a handover parameter and a second curve being a function of the count of too late handovers in relation to the handover parameter.

FIG. 3A shows a first curve HTE (handover too early) that is a function of the count CO of too early handovers in relation to a handover parameter HP and a second curve HTL (handover too late) that is a function of the count CO of too late handovers in relation to the handover parameter HP. The too early and too late handovers may both be handovers that lead to a radio link failure or a handover failure.

Figure 3B:
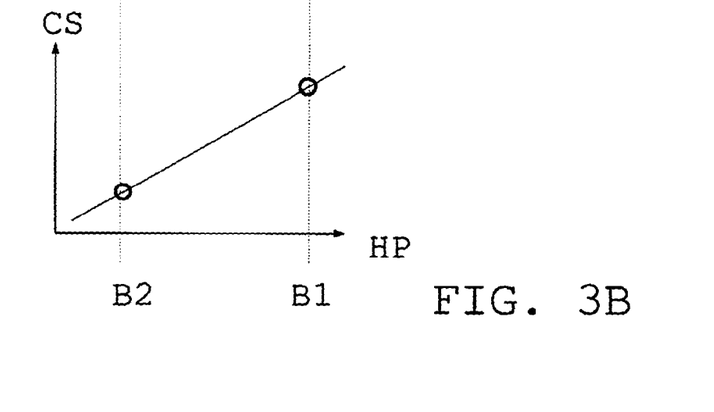
FIG. 3B shows a curve of the cell coverage as a function of the handover parameter.

FIG. 3B shows a curve of the cell coverage CS as a function of the handover parameter HP.

In FIG. 3A only too-early HO events and too-late HO events are shown for simplicity. Handover to a wrong cell and handover oscillation are not included.

For the MRO function in FIG. 3A, it can be found that as the value of the handover parameter HP increases, the probability of too early HO increases while that of too late HO decreases. So, when a large amount of too early HO events are detected, the handover parameter HP should be decreased; when a large amount of too late HO events are detected, the handover parameter should be increased. To make sure the possibilities of both too early HO and too late HO events are under a pre-configured threshold, the handover parameter adjustment should be restricted within a so-called "MRO safe range" or handover parameter range, with a first boundary B1 that in this example is also an upper boundary and a second boundary B2 that in this example is a lower boundary. The handover parameter range is thus defined by the first and the second boundary B1 and B2.

For MLB function in the second diagram shown below the first diagram, when load is off-loaded to a neighbor cell, the handover parameter HP can be increased, but not above the first boundary B1, otherwise too-early HO failure occurs. When load is off-loaded from neighbor cell, the handover parameter can be decreased, but not below the second boundary B2, otherwise too-late HO failure occurs. In FIG. 3B there is more particularly shown the trend of the cell coverage CS as a function of the handover parameter HP together with the first and second boundary B1 and B2. CIO is negative to the value of HOM. HOM is the additional offset at a serving cell. Therefore, for the high load at the serving cell, CIO which is added for the neighbor cell metrics is increased (which is equivalent to a decrease the HOM for the serving cell), and then the cell edge UE would move to the neighbor cell.

MRO and MLB have their own evaluation cycles, and normally, the length of MRO evaluation cycle is several times longer than the MLB evaluation cycle. For both kinds of adjustment, the parameter value may be adjusted with decrementing or incrementing steps for instance within an adaptable range bounded by a fixed frame of −24-+24 dB. This is the basic MRO-MLB coordination mode.

It can thus be seen that a handover parameter range is determined, which range is defined by the first and the second boundary B1 and B2.

The present invention is thus concerned with how this handover parameter range is determined and employed for use with two different functions.

Figure 4:
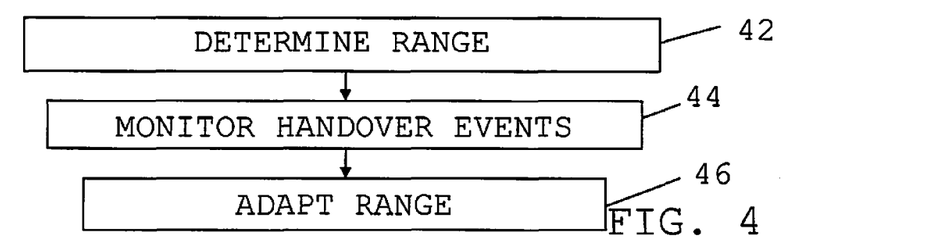
FIG. 4 shows a flow chart of a number of method steps in a method for controlling a handover parameter range for the handover parameter according to a first embodiment of the invention.

A first embodiment of the invention will now be described with reference being made to FIG. 1, 2 and FIG. 4, which latter shows a flow chart of a number of method steps in a method for controlling a range for the handover parameter according to this first embodiment. The method is furthermore being performed by the handover parameter range controlling device 32. According to the invention the parameter range controlling device is provided in a network node of the wireless communication network. The node may be a node in the access network 10. In the first and later described embodiments this node is a base station, such as the first base station 14. However, it should be realized that the device may be provided in other network nodes. In other types of networks it may be provided in a so-called radio network controller (RNC). However it may also be provided in the core network 11, such as in the MME 22.

The method of the first embodiment starts with the range setting unit 36 determining a handover parameter range, step 42. The handover parameter range may be determined using a mobility function, such as the MRO function handled by unit 38 and described above in relation to FIG. 3a. This handover parameter range is then employed by both the functions handled by the units 38 and 40. During this use, the event monitoring unit 34 monitors the handover events in the wireless communication network step 44. The events being monitored are furthermore the events concerning the first cell C1 and possibly also concerning the second cell C2 as well as possibly also other cells. However the events being monitored typically all involve the first cell C1 in some way or the other in that this cell is a cell to which or from which handover is made in all the events. The monitoring may be performed through the event monitoring unit 34 investigating received RRC messages concerning failed and successful handovers being received by communication handling unit 30 when the handover parameter range is used by both the functions. More particularly the events may comprise indications of too early handover, indications of too late handover, indications of handover to the wrong cell and indications of handover oscillation. These indications may be received in the communication handling unit 30 from the user equipment 12 via the aerial interface, from other base stations, such as the second base station 16, via the X2 interface, as well as from the MME 22 via the S2 interface. The events may furthermore be events obtained for a certain parameter value that is being used by the two functions.

The events that are related to the first cell C1 are then forwarded to the range setting unit 36, which goes on and adapts the handover parameter range based on the monitored handover events, step 46. The adapting may here comprise increasing the range as well as decreasing the range. If for example a high amount of handover events indicating handover problems are obtained such as events indicating too early handover, too late handovers and handover oscillation, then the range may be decreased or contracted, while if no or a low amount are obtained, for instance during a long use of an interval together with the load balancing function being active, then the range may be increased or expanded.

This first embodiment has some advantages. It provides a low-complexity solution to handle the coordination of the mobility function and the load balancing function. The range can also be changed dynamically and in a self-adaptable way, so that these two functions can work harmoniously. Good handover performance is ensured together with to maximized load balancing.

In this way the range of allowable parameter values is changed based on the monitored events. The handover parameter range may further be dynamically adapted based on handover parameter values used in the mobility function, which function in this example is MRO.

It can thus be seen that the method concerns the controlling of a range for the handover parameter used in the mobility function and the load balancing function for a cell, exemplified by the first cell, in relation to a neighbour cell, exemplified by the second cell C2.

Figure 5:
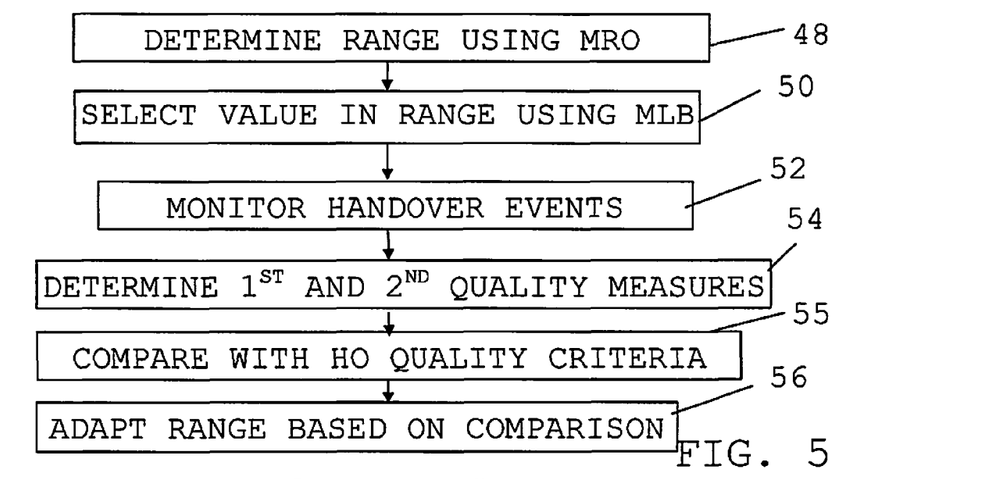
FIG. 5 shows a flow chart of a number of method steps in a method for controlling the handover parameter range for the handover parameter according to a second embodiment of the invention.

A second embodiment of the invention will now be described with reference being made to FIGS. 1, 2 and 5, where FIG. 5 discloses a flow chart of a number of method steps in a method for controlling a range for the handover parameter being performed in the handover parameter range controlling device 32.

The method of the second embodiment starts with the range setting unit 36 determining a handover parameter range, step 48. The range is here determined using a mobility function and in the example of the second embodiment using the MRO function. The MRO function furthermore adjusts the value of the handover parameter in order to reduce a handover failure rate. Therefore as the mobility function handling unit 38 carries out the mobility function, the range is being determined by the range setting unit 36. Thereafter the load balancing function used by the load balancing function handling unit 40 is used to select a current value CV in the range, step 50. This means that the range setting unit 36 allows the load balancing function to use values in the handover parameter range in order to off-load traffic from or to neighbor cells. The load balancing function is in this example the MLB function, which thus selects and uses a value in the range based on the current load of the cell. The handover events concerning the selected value CV are then monitored by the event monitoring unit 34, step 52, i.e. handover events obtained when the selected value CV is used. The events being monitored are furthermore the events concerning the first cell C1 and possibly also the concerning the second cell C2.

The events are then forwarded to the range setting unit 36, which goes on and determines at least one handover quality measure based on the monitored handover events. In this example it determines a first and second handover quality measure, step 54. A handover quality measure may be determined based on the monitored handover events collected for a currently used handover parameter value. The first handover quality measure is furthermore associated with the first boundary B1 of the range and the second handover quality measure is associated with the second boundary B2 of the range. The first handover quality measure can therefore be seen as a first relation that exists between the current handover parameter value CV, the first boundary B1 and the monitored handover events, which events at least comprise events regarding handovers being performed too early. The second handover quality measure can be seen as a relation between the current handover parameter value CV, the second boundary B2 and the monitored handover events, which events at least comprise events regarding handovers performed too late. In both cases the handover events may be handover events obtained while the current handover value is used. The range setting unit 36 then compares each handover quality measure with a corresponding handover quality criterion, step 55. In this example it compares the first handover quality measure with a first handover quality criterion and the second handover quality measure with a second handover quality criterion. Based on the results of these comparisons, the range setting unit 36 then adapts the range, step 56. This adaptation may furthermore be an adaption based on how well the handover quality measures meet the handover quality criteria set up for them. The first boundary may thus be adjusted based on the amount of correspondence between the first handover quality measure and the first handover quality criterion and the second boundary may be adjusted based on the amount of correspondence between the second handover quality measure and the second handover quality criterion. The first boundary B1 may in some variations of the invention be adjusted if the first handover quality measure matches the first handover quality criterion and the second boundary B2 may be adjusted if the second handover quality measure matches the second handover quality criterion. A handover quality measure may for instance be computed as a value, which depends on the current handover parameter value, the range and the monitored events. Such a value may then be compared with a threshold value, making up at least a part of the handover quality criterion and the boundary may be adjusted by the value reaching or crossing the threshold, signalling that the criterion is matched. The amount of correspondence or how well a handover quality measure meets a criterion may with the example of computed values and threshold given above as an alternative be how close the value is to the threshold. The range may based on this be changed with smaller or larger steps based on how close the value is to a threshold.

A first part of a third embodiment will now be described with reference being made to FIGS. 1 and 2 as well as to FIGS. 6 and 7.

Figure 6:
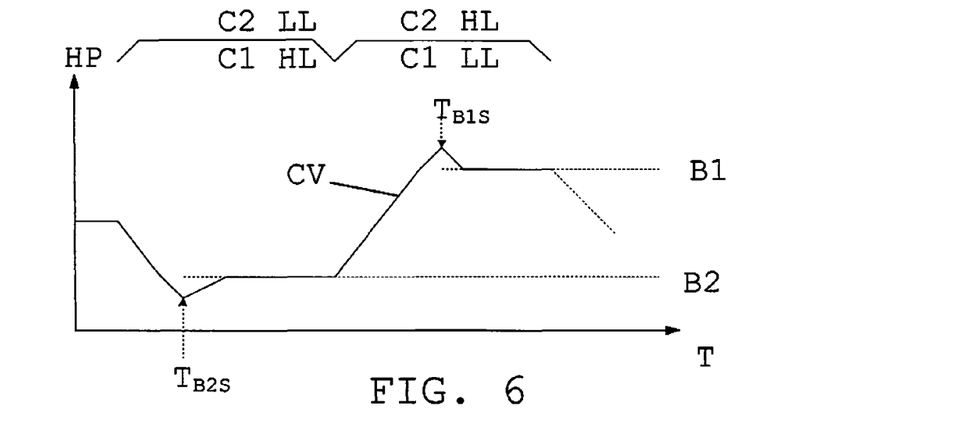
FIG. 6 shows a curve of the change of the handover parameter over time during control of the handover parameter range.
Figure 7:
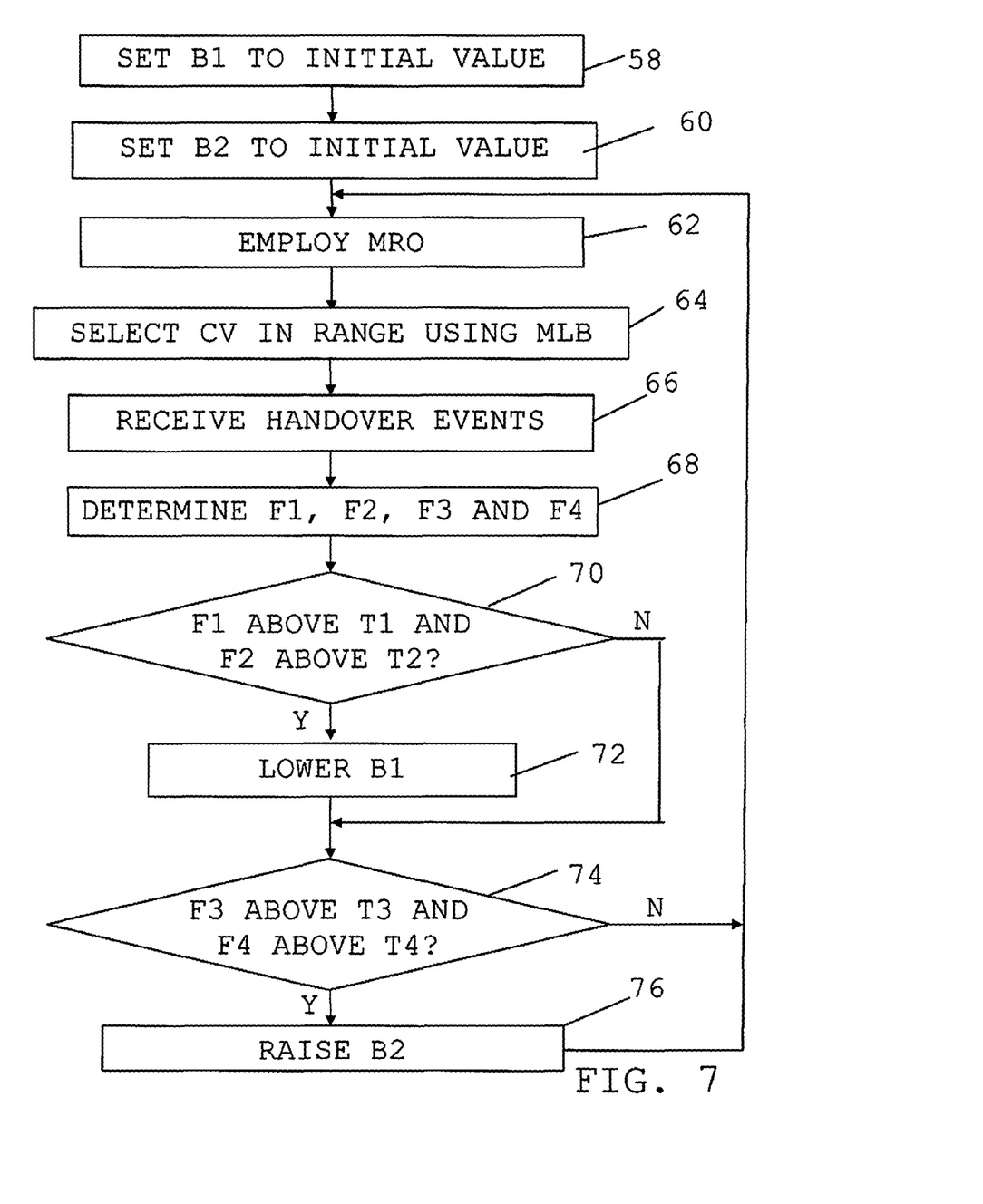
FIG. 7 shows a flow chart of a number of method steps being performed in a first part of a method for controlling the handover parameter range for the handover parameter according to a third embodiment of the invention.

FIG. 6 here shows a first diagram with a curve of the change of a handover parameter HP over time, while FIG. 7 shows a flow chart of a number of method steps being performed in the first part of the method according to the third embodiment of the invention. In this example the handover parameter is again CIO. The value of the handover parameter occupied at a certain instance in time is furthermore denoted a current value.

The load balancing function will strive to use different values of the handover parameter depending on if the first cell C1 experiences a high or a low load.

Furthermore, also the load of the neighbour cell C2 will influence the used handover parameter value. As can be seen in FIG. 6, the handover parameter value will be fairly low when the load of the first cell C1 is high HL combined with the load of the second cell C2 being low LL. The handover parameter value will on the other hand be high when the load of the first cell C1 is low LL and the load of the second cell C2 is high HL.

With regards to FIG. 7. the first part of the method starts with the range setting unit 36 setting the first boundary B1 to a first initial value, step 58, and setting the second boundary B2 to a second initial value for obtaining the handover parameter range. These initial values may be the maximum and minimum values that the handover parameter may have, such as +∞ or +24 dB and −∞ or −24 dB. It should however be realized that also other values may be used. It is for instance possible to use +2 dB and −2 dB instead, so as to accelerate the reaching of proper values and avoid HO failures in a preliminary network deployment. The MRO function is then used, step 62. Initially this function may be used by the mobility function handling unit 38 to limit the range until a steady state is reached, i.e. until ΔMRO=0 is reached. Steady state may thus be reached when the handover value adjustment due to MRO is zero. This may be implemented through the first and second handover quality measures being investigated for the different handover parameter values used by the mobility function implemented in the mobility function handling unit 38 until the function is stabilized. This means that the boundaries may be changed step-wise, and here typically decreased stepwise until steady state operation is obtained. It should be realized that the waiting for a steady state is optional.

Thereafter, the load balancing handling unit 40 starts to operate because of a load situation change, for instance through a shift towards a low load in the first cell C1 combined with a high load in a neighbor cell such as the second cell C2 or a shift towards a high load in the first cell C1 combined with a low load in the neighboring cell. The load balancing function of the load balancing function handling unit 40 therefore selects a value in the range as a current value CV, step 64. A value in the handover parameter range is thus selected by the MLB function based on the current load. In this process, the current value CV may actually be at the first or the second boundary B1 and B2. The event monitoring unit 34 then monitors the events associated with the selected parameter value through monitoring the activities of the communication handling unit 30. These events are the events that are generated when the selected parameter value is used. The event monitoring unit 34 thereafter forwards these events to the range setting unit 36. The range setting unit 36 thus receives handover events concerning the first cell C1 from the event monitoring unit 34, step 66.

Thereafter the range setting unit 36 proceeds and determines the first and second handover quality measures. The first handover quality measure is in this third embodiment made up of a first factor F1 and a second factor F2, while the second handover quality measure is made up of a third factor F3 and a fourth factor F4. The range setting unit 36 now proceeds and determines these factors F1, F2, F3 and F4, step 68. The first factor F1 furthermore depends on the failure rate of handovers being performed too early and the second factor F2 depends on the difference between the failure rate of handovers being performed too early and the failure rate of handovers being performed too late. These rates are all associated with the first cell C1 as well as the current handover parameter value CV. In a similar manner the third factor F3 depends on the failure rate of handovers being performed too late and the fourth factor F4 depends on the difference between the failure rate of handovers being performed too late and the failure rate of handovers being performed too early, also associated with the first cell C1 and the current handover parameter value CV. This means that for a certain current parameter value CV being used by both the functions, i.e. by both MRO and MLB, the failure rate of handovers being performed too early and too late are determined. Based on these rates, the factors F1, F2, F3 an F4 are then determined. Each factor may be determined through counting the handover events, for instance according to type of handover event, such as the events indicating handovers being performed too early. A sum may then be formed for each type of handover event. A factor may thereafter be formed as one sum divided by the total number of handovers or as a difference between two sums associated with two types of events and divided by the total number of handovers. In this way a factor representing the rate of handover failure according to type and a factor representing the rate of the difference between two type of handover failures are obtained. It is as an alternative possible that no rates are determined, but that a sum and a difference between two sums are directly compared with corresponding thresholds.

When this has been done the range setting unit 36 investigates if the first handover quality measure meets the first handover quality criterion. This is in this third embodiment done through comparing the first factor F1 with a first threshold T1 and comparing the second factor F2 with a second threshold T2. The first threshold is here a first factor criterion and the second threshold is a second factor criterion. It can thus be seen that the first handover quality criterion comprises a first factor criterion and a second factor criterion. If now both these factors exceed their corresponding thresholds, step 70, then the first handover quality criterion for adapting the first boundary B1 has been met, which is here a criterion for shrinking the range and this first boundary B1 is lowered, step 72. Range limitation is thus performed if both factor criteria are met. This means that if the first factor F1 exceeds the first threshold T1 and the second factor F2 exceeds the second threshold T2, then the first boundary B1 is lowered. The lowering may here be a decrementing. However, if none of the factors F1 and F2 exceed their corresponding thresholds T1 and T2 or if only one of them exceeds its corresponding threshold, then the first boundary B1 is retained.

Thereafter it is time for investigating if the second handover quality measure meets the second handover quality criterion. This is in this third embodiment done through comparing the third factor F3 with a third threshold T3 and comparing the fourth factor F4 with a fourth threshold T4. The third threshold is here a third factor criterion and the fourth threshold is a fourth factor criterion. It can thus be seen that the second handover quality criterion comprises a first factor criterion and a second factor criterion. If now both these factors exceed their corresponding thresholds, step 74, then the range is shrunk or limited, here through the second boundary B2 being raised by the range setting unit 36, step 76. Range limitation is thus performed if both factor criteria are met. This means that if the third factor F3 exceeds the third threshold T3 and the fourth factor F4 exceeds the fourth threshold T4, then the second boundary B2 is raised. The raising may here be incremental. However if none exceed their corresponding thresholds or if only one of these factors exceeds its corresponding threshold, then the boundary is retained. How the changing of the boundaries is carried out is shown in FIG. 6 where the second handover quality measure meets the second handover quality criterion at a point in time $T_{B2S}$ leading to the raising of the second boundary B2. Some time later the first handover quality measure meets the first handover quality criterion at a point in time $T_{B1S}$ followed by a lowering of the first boundary B1. It should be realized that the order in which the investigation of the handover quality measures is performed may be reversed. The second handover quality measure may be investigated before the first handover quality measure.

Thereafter the range setting unit 36 again lets the MRO function operate through the use of unit 38, step 62, lets the MLB function select a value in the range through the use of unit 40, step 64, receive handover events from the event monitoring unit 34, step 66, determines the different factors, step 68 and compares them with the thresholds, step 70 and 74.

It can be seen that if this type of operation is continued the range will only shrink or decrease. The adapting thus comprises shrinking the range. The second and fourth factors used above are provided for ensuring that the range cannot shrink when there is too small a difference between too late and too early handovers. It would sometimes be of interest to let the range also expand or increase. The second part of the method according to the third embodiment is directed towards this situation.

Figure 8:
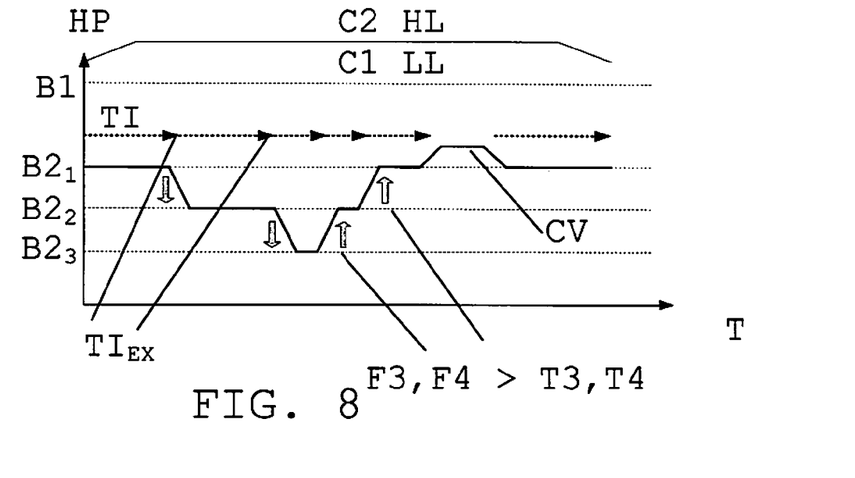
FIG. 8 shows a second diagram with a curve of the change of the handover parameter over time.
Figure 9:
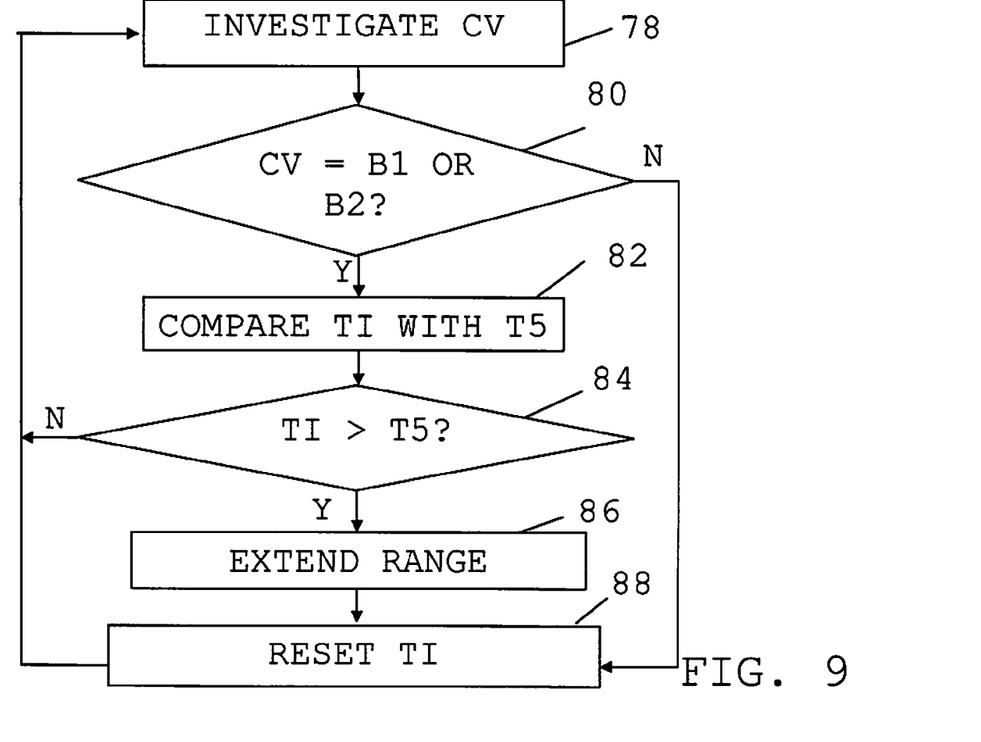
FIG. 9 shows a flow chart of a number of method steps being performed in a second part of the method for controlling the handover parameter range for the handover parameter according to the third embodiment.

This will now be described with reference also being made to FIGS. 8 and 9, where FIG. 8 shows a curve of the change of the handover parameter HP over time at low load LL for the first cell C1 and high load of the second cell C2, and FIG. 9 shows a flow chart of a number of method steps being performed in the second part of the method according to the third embodiment of the invention.

The range setting unit 36 here investigates the timer 37, the value of which is compared with a fifth threshold T5 set to a timer expiry value $TI_{EX}$.

The range setting unit 36 continuously investigates the current value CV of the handover parameter, step 78, and if this value reaches one of the boundaries B1 or B2, step 80, then the timer 37 is started. In FIG. 8 it can be seen that the value CV in the beginning is at a first level $B2_1$ of the second boundary. The value of the timer 37 is then compared with the fifth threshold T5, step 82, and if it is below the threshold T5, step 84, investigation is continued, step 78. However if the handover parameter value leaves the boundary in the direction towards the opposite boundary, then the timer 37 is reset, step 88, and then the handover parameter value is again investigated, step 78. It can be seen that if the handover parameter value stays at the first level $B2_1$ of the second boundary some time, i.e. if it stays at the boundary until the timer exceeds the threshold T5, step 84, then the range setting unit 36 extends the range, step 86. In the example in FIG. 8, the range is extended through the second boundary being lowered to a second level $B2_2$. If the parameter value now stays at this second level $B2_2$ until the timer 37 again expires, then the boundary is again lowered to a third level $B2_3$.

The example of FIG. 8 concerned the second boundary. The same type of handling is performed with regard to the first boundary B1, which situation typically occurs at high load of the first cell and low load of the second cell C2.

It can in this way be seen that it is also possible to expand the range. It can thus be seen that if the handover parameter value stays at a level of the first or the second boundary B1 and B2 continuously over a given-length period, for instance 4 hours, the boundary in question would be extended to the next enumerated level and that if at the new boundary level, the handover quality measure meets its criterion, the boundary in question will return to its last enumerated level.

This expanding is furthermore combined with decreasing of the range based on investigating of the first and second handover quality measures. This is exemplified in FIG. 8 through the fact that after the last expansion of the range there is a decrease of the range because the third and fourth factors F3 and F4 exceed the corresponding thresholds T3 and T4, which happened twice. At both these instances the timer was furthermore reset, which also happens when the handover parameter value in question leaves the boundary.

It can thus be seen that the shrinking of the range is event-based and dynamic. Furthermore timer-based self-adaptation is used to expand the range. These two operations may be asynchronous and could also have different cycles.

In the example above there was only one timer for both boundaries. It is as an example possible with two timers, one for each boundary. However these two timers will only be active one at a time.

This invention proposes a low-complexity solution to handle the coordination of two self organizing network (SON) functions: MRO and MLB. It maintains only two boundary values and one timer for each neighbor cell-relation. The invention makes the MRO parameters dynamically configurable and the MLB allowable adjustment region self-adaptable, so that these two functions can work harmoniously, on the one hand, the handover performance is guaranteed to be good, and on the other hand, the potential adjustment range for load balance can be maximized and adapted to the radio conditions and network deployment variances.

There are many variations that can be made to the invention apart from those already mentioned. The first handover quality measure may for instance only comprise the first factor and the second handover quality measure may only comprise the second factor.

The handover parameter range control device 32 described earlier may be provided in the form of a processor with associated program memory including computer program code for performing the functionality of the corresponding elements. It should be realized that it may also be provided in the form of hardware, like for instance in the form of ASICs circuit.

The radio communication units may typically be made up of conventional baseband coding element and modulating elements and amplifying elements.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method of adapting a range for a handover parameter used in a mobility function and a load balancing function for a cell in relation to a neighbor cell in a wireless communication network, the method being performed by a node in the wireless communication network and comprising:
   determining the handover parameter range;
   selecting a value in the handover parameter range based on a current load of the cell;
   monitoring handover events in the wireless communication network concerning the cell, wherein the monitored handover events comprise handover events obtained when the selected value is used; and
   adapting the handover parameter range based on the monitored handover events.

2. The method according to claim 1, wherein adapting includes shrinking the handover parameter range.

3. The method according to claim 1, wherein the handover parameter range is defined by a first boundary and a second boundary.

4. The method according to claim 3, wherein determining the handover parameter range includes determining the handover range using the mobility function.

5. The method according to claim 3, further comprising adjusting the handover parameter range based on handover parameter values used in the mobility function.

6. The method according to claim 5, further comprising:
   investigating whether the handover parameter value has stayed at one of the first and second boundaries within an investigation time period; and
   expanding the handover parameter range responsive to a determination that the handover parameter value has stayed at at least one of the first and second boundaries within the investigation time period.

7. The method according to claim 6, wherein investigating includes comparing a timer running for the at least one of the first and second boundaries to a threshold, and wherein expanding the handover parameter range comprises changing the at least one of the first and second boundaries for extending the handover parameter range when the threshold is exceeded and resetting the timer each time at least one of the first and second boundaries is changed.

8. The method according to claim 3, further comprising initiating the handover parameter range by assigning a first initial value to the first boundary and a second initial value to the second boundary and applying the mobility function for limiting the handover parameter range until a steady state is reached.

9. The method according to claim 3, further comprising determining at least one handover quality measure based on the monitored handover events and comparing the handover quality measure with a corresponding handover quality criterion, wherein adapting includes adapting the handover parameter range based on results of the comparison.

10. The method according to claim 9, wherein the at least one handover quality measure comprises a first handover quality measure associated with the first boundary and handovers being performed too early and a second handover quality measure associated with the second boundary and handovers being performed too late.

11. The method according to claim 10, wherein the first handover quality measure comprises a first factor and a second factor, wherein the first factor depends on handovers being performed too early and the second factor depends on a difference between handovers being performed too early and handovers being performed too late, each being compared with a corresponding factor criterion, and wherein adapting includes adapting the handover parameter range based on results of the comparisons.

12. The method according to claim 11, wherein adapting includes adjusting the first boundary based on the first factor meeting a first factor criterion and the second factor meeting a second factor criterion.

13. The method according to claim 10, wherein the second handover quality measure comprises a third factor and a fourth factor, wherein the third factor depends on handovers being performed too late and the fourth factor depends on a difference between handovers being performed too late and handovers being performed too early, each being compared with a corresponding factor criterion, and wherein adapting includes adapting the handover parameter range based on results of the comparisons.

14. The method according to claim 13, wherein adapting includes adjusting the second boundary based on the third factor meeting a third factor criterion and the fourth factor meeting a fourth factor criterion.

15. A device for adapting a range for a handover parameter used in a mobility function and a load balancing function for a cell in relation to a neighbor cell in a wireless communication network, the device being implemented in a node in the wireless communication network and comprising:
 a processing circuit configured to:
  determine the handover parameter range;
  select a value in the handover parameter range based on a current load of the cell;
  monitor handover events in the wireless communication network concerning the cell, wherein the monitored handover events comprise handover events obtained when the selected value is used; and
  adapt the handover parameter range based on the monitored handover events.

16. The device according to claim 15, wherein the processing circuit is configured to shrink the handover parameter range when adapting the handover parameter range.

17. The device according to claim 15, wherein the handover parameter range is defined by a first boundary and a second boundary.

18. The device according to claim 15, wherein the processing circuit is configured to determine the handover parameter range based on operations of the mobility function.

19. The device according to claim 15, wherein the processing circuit is configured to adjust the handover parameter range based on handover parameter values used in the mobility function.

* * * * *